United States Patent Office.

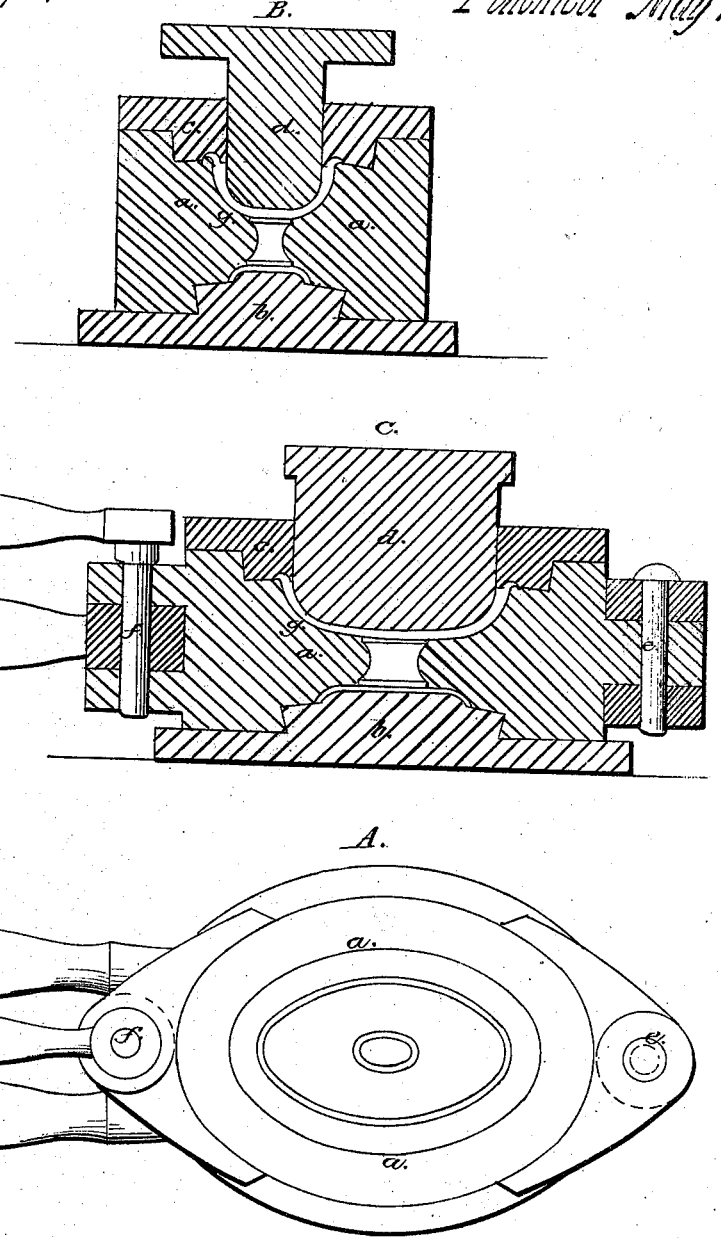

ALONZO E. YOUNG, OF DORCHESTER, MASSACHUSETTS, ASSIGNOR TO BOSTON SILVER-GLASS COMPANY.

Letters Patent No. 90,040, dated May 11, 1869.

IMPROVEMENT IN GLASS-WARE MOULD.

The Schedule referred to in these Letters Patent and making part of the same.

*To all whom it may concern:*

Be it known that I, ALONZO E. YOUNG, of Dorchester, in the county of Norfolk, and State of Massachusetts, have invented an Improvement in the Manufacture of Oval Glass-Ware; and I do hereby declare that the following, taken in connection with the drawings which accompany and form part of this specification, is a description of my invention sufficient to enable those skilled in the art to practise it.

All moulded articles of glass-ware, in the form of dishes, supported upon legs, or standards, (made at the same time and integral with the dishes,) have heretofore been made round, or rectangular in shape, all moulded oval glass dishes having been made without any centrally-projecting pillars, or supports.

My invention relates to the production of oval glass dishes, each preferably moulded with a central pillar, or supporting-standard depending therefrom; and The invention consists in a mould having an oval matrix turned therein in an oval lathe, said matrix being preferably so formed as to mould a glass dish oval in shape, and supported upon a central pillar, or standard.

The drawings represent a glass-mould embodying my improvement.

A shows a plan of the mould, the cap and plunger being removed.

B is a central cross-section of the mould.

C is a central longitudinal section of it.

*a a* denote the two cheeks, or cottles of the matrix.

*b*, the bottom, or core-plate.

*c*, the cap.

*d*, the plunger, the two cottles *a a* being jointed together at one end by a hinge-pin, *e*, and confined together by a bolt-pin, *f*, at the opposite end.

The glass is pressed and moulded into form between the surfaces of the cavity, or matrix *g*, and the surfaces of the core and plunger.

The interior surface of the matrix is turned in a suitable lathe to an oval or elliptical shape, or so that any horizontal section taken through it, or through the dish-forming part of the boundary of the cavity, shall be an ellipse, such elliptical form preferably extending through the leg and base-forming cavity, and the outer surfaces of the plunger and core being turned to concentrically elliptical form, so that a dish formed in the mould will have the required shape with a supporting-standard or foot.

Where, heretofore, oval glass-ware has been made by moulding, it has been formed in hand-made moulds, which, besides being extremely expensive, are necessarily imperfect, no amount of expenditure of time and skill in hand-labor being sufficient to produce a faultless oval or elliptical mould.

Hence it has followed that moulded oval glass-ware has been put upon the market to but a comparatively small extent, the cost of hand-made moulds keeping up the price of the ware made in them, and the obvious imperfections of the ware preventing its sale.

I am, and have long been aware that glass-ware moulds have been made having cheeks hinged and locked together, and having also a bottom, a cap, and a plunger, all on their moulding-surfaces wrought to a circular form, as for example, see the patent of A. J. Sweeney, July, 1860, but I make no claim to a mould of such construction, my claim being strictly confined to moulds for forming glass-ware in which the moulding-surfaces are wrought oval, or elliptical, by the operation of what is known as an oval-lathe.

I claim a lathe-turned mould, for forming glass dishes, said mould having a cavity and plunger, the moulding-surface of each of which is oval in section, substantially as described.

ALONZO E. YOUNG.

Witnesses:
J. B. CROSBY,
FRANCIS GOULD.